S. B. Burritt,
Lathe Chuck,

№ 48,259. Patented June 20, 1865.

Witnesses.
L. Holmes Jr.
J. W. Coombs

Inventor.
S. B. Burritt

UNITED STATES PATENT OFFICE.

S. B. BURRITT, OF NEW YORK, N. Y.

IMPROVED LATHE-CHUCK.

Specification forming part of Letters Patent No. 48,259, June 20, 1865.

*To all whom it may concern:*

Be it known that I, S. B. BURRITT, of the city, county, and State of New York, have invented a new and useful Improvement in Lathe-Chucks for Holding Drills or other Revolving Tools; and I do hereby declare that the following is a full, clear, and exact description of the same, reference being had to the accompanying drawings, forming part of this specification, in which—

Figure 1:
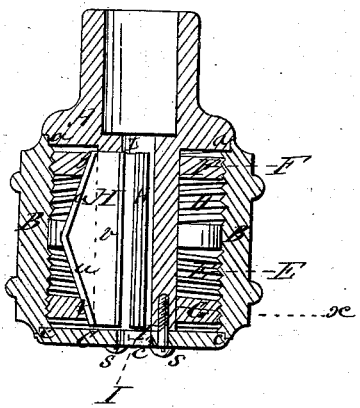
Figure 2:
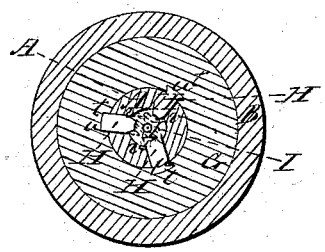

Figure 1 is a central longitudinal section of my invention. Fig. 2 is a transverse section through the line $x$ in Fig. 1.

Similar letters of reference indicate corresponding parts in both figures.

The object of my invention is to enable the chuck of a lathe to hold concentrically drills or other tools with shanks of different sizes. The chuck is fitted with radially-adjustable clamps; and the invention consists in a novel and very simple means whereby the several clamps are adjusted simultaneously and severally kept at uniform distance from the axis of the chuck.

To enable others to construct and apply my invention, I will proceed to describe it with reference to the drawings.

Upon the principal part or hub A of the chuck there is placed against the shoulder $a$ a revolving collar or sleeve, B, which bears at one end against the shoulder $a$ and at the other end against a shoulder, $c$, upon a plate, C, which is secured to the hub A by screws $s$ $s$. This plate has a central opening, $c^2$, large enough to admit the shank of the largest tool to be used in the chuck.

Upon the interior surface of the sleeve B there are cut two female screw-threads, D and E, the one being a right-hand thread and the other a left. These threads commence at opposite ends of the sleeve and run nearly to the longitudinal center thereof. Into these threads are fitted, free to move, two rings, F and G, which have upon their periphery male threads corresponding to the threads on the sleeve B. Each of these rings is provided with a central circular opening, which fits over the cylindrical portion of the hub of the chuck within the sleeve B. Three or more dovetailed grooves, $t\ t\ t$, are cut in this circular opening at an inclination to the axis of the ring to receive the dovetail tongues $u\ u$ upon the inclined outer edges of the sliding or adjustable radial clamps H H H, which correspond in number with the said grooves. The said inclined outer edges have equal inclinations in opposite directions, commencing at the ends of and meeting at or near the longitudinal centers of the clamps. The said clamps are fitted to slide in parallel-sided straight radial openings $v\ v$ in the hub, and their inner edges, which are straight, project into the longitudinal cylindrical cavity I of the hub, the said cavity corresponding in diameter with the opening $c^2$ of the plate C, before mentioned.

The several clamps are moved simultaneously toward the center or from it by turning the sleeve B in one or the other direction on the hub A.

The rings F G are prevented by the clamps from turning with the sleeve, but caused to approach and recede from each other by the action of the screw-threads D E as the sleeve is turned, and as they approach or recede from each other the grooves $t\ t$ in the said rings act like wedges upon the double-inclined dovetail tongues of the clamps, and thereby move the said clamps toward or from the axis of the chuck, the two inclinations of the clamps being acted upon simultaneously and uniformly, and the straight inner edges of the clamps being always kept parallel with the axis of the chuck. When the sleeve is turned in one direction it will cause the two rings to approach each other, and the clamps will thereby be forced toward the axis of the chuck, and if there is a tool or drill placed in the central longitudinal cavity of the hub, it will be clamped or held there securely and centrally. In order to release it, the sleeve must be turned in an opposite direction to the one last mentioned. In this manner the chuck may be made to hold a drill or tool the diameter of whose slant is equal to the space formed between the three or more clamps when moved as near the center of the cavity I as possible, this position being shown by the red lines upon Fig. 2.

I do not claim, broadly, the use of radial clamps for chucks for holding drills or tools; but What I do claim as my invention, and desire to secure by Letters Patent, is—

The combination of the radially-movable clamps H H, having dovetail tongues of double reversed inclination on their outer edges, the rings F and G, having right and left hand male screws upon their exteriors and inclined dovetail grooves in their interiors, and the loose sleeve B, having right and left hand female screw-threads in its interior, the whole arranged and applied in relation to each other and to the hub A or body of the chuck and operating substantially as herein specified.

S. B. BURRITT.

Witnesses:
J. W. COOMBS,
GEO. W. REED.